US011606542B2

(12) United States Patent
Zhang et al.

(10) Patent No.: US 11,606,542 B2
(45) Date of Patent: Mar. 14, 2023

(54) PROJECTION IMAGE AUTOMATIC CORRECTION METHOD AND SYSTEM BASED ON BINOCULAR VISION

(71) Applicant: GOERTEK INC., Weifang (CN)

(72) Inventors: Shaoqian Zhang, Weifang (CN); Zhenni Bi, Weifang (CN)

(73) Assignee: GOERTEK INC., Weifang (CN)

( * ) Notice: Subject to any disclaimer, the term of this patent is extended or adjusted under 35 U.S.C. 154(b) by 78 days.

(21) Appl. No.: 17/395,649

(22) Filed: Aug. 6, 2021

(65) Prior Publication Data

US 2021/0368147 A1 Nov. 25, 2021

Related U.S. Application Data

(63) Continuation of application No. PCT/CN2019/129586, filed on Dec. 28, 2019.

(30) Foreign Application Priority Data

Oct. 30, 2019 (CN) .......................... 201911045424.9

(51) Int. Cl.
*H04N 9/31* (2006.01)
*H04N 13/128* (2018.01)
*H04N 13/363* (2018.01)

(52) U.S. Cl.
CPC ......... *H04N 9/3185* (2013.01); *H04N 9/3194* (2013.01); *H04N 13/128* (2018.05); *H04N 13/363* (2018.05)

(58) Field of Classification Search
CPC .. H04N 9/3185; H04N 9/3194; H04N 13/128; H04N 13/363
See application file for complete search history.

(56) References Cited

U.S. PATENT DOCUMENTS 7,015,954 B1 * 3/2006 Foote ...................... G06T 5/006
348/E13.014
7,103,212 B2 * 9/2006 Hager ..................... G06V 10/24
348/47
(Continued)

FOREIGN PATENT DOCUMENTS

CN 1830207 A 9/2006
CN 102780834 A 11/2012
(Continued)

OTHER PUBLICATIONS

International Search Report and Written Opinion issued in corresponding International Application No. PCT/CN2019/129586; dated Jun. 28, 2020, 14 pgs.
(Continued)

*Primary Examiner* — Brian P Yenke
(74) *Attorney, Agent, or Firm* — Hauptman Ham, LLP

(57) ABSTRACT

A projection image automatic correction method and system based on binocular vision. The method includes: acquiring a depth map of a projection image on a projection plane; calculating a first transformation relationship between a source image and the projection image; acquiring a distortion image according to the depth map; acquiring a correction image after correcting the distortion image; calculating a second transformation relationship between the distortion image and the correction image; acquiring a correction relationship between the source image and the correction image according to the first transformation relationship and the second transformation relationship; and correcting the projection image according to the correction relationship. This disclosure is configured to realize the efficient automatic correction of the projection image without being limited by the projection area, and the correction flexibility is high.

10 Claims, 3 Drawing Sheets

(56) References Cited

U.S. PATENT DOCUMENTS

| | | | | |
|---|---|---|---|---|
| 9,674,504 B1* | 6/2017 | Salvagnini | ............ | G06V 10/147 |
| 10,401,716 B2* | 9/2019 | Edwards | ................. | G06T 7/586 |
| 10,412,380 B1* | 9/2019 | Neira | .................... | H04N 13/363 |
| 10,989,540 B2* | 4/2021 | Song | ........................ | G06T 7/579 |
| 2009/0190046 A1* | 7/2009 | Kreiner | ................ | H04N 9/3147 |
| | | | | 348/789 |
| 2010/0182406 A1* | 7/2010 | Benitez | ..................... | G06T 7/55 |
| | | | | 348/46 |
| 2011/0157555 A1* | 6/2011 | Mashitani | .............. | G03B 35/16 |
| | | | | 353/7 |
| 2012/0300044 A1* | 11/2012 | Thomas | ............... | H04N 13/349 |
| | | | | 348/51 |
| 2014/0063268 A1* | 3/2014 | Kao | ......................... | H04N 9/31 |
| | | | | 348/189 |
| 2014/0118501 A1* | 5/2014 | Kim | ........................... | G06T 7/85 |
| | | | | 348/46 |
| 2014/0292817 A1* | 10/2014 | Iversen | ................ | H04N 13/363 |
| | | | | 345/672 |
| 2015/0097932 A1* | 4/2015 | Lin | ........................ | G09G 3/002 |
| | | | | 348/51 |
| 2017/0324944 A1* | 11/2017 | Nakajima | ............ | H04N 13/363 |
| 2018/0014008 A1* | 1/2018 | Sugiura | ................ | G03B 21/142 |
| 2018/0213215 A1* | 7/2018 | Picarougne | .......... | H04N 13/363 |
| 2019/0051010 A1* | 2/2019 | Zhu | ............................ | G06T 7/55 |
| 2019/0213745 A1 | 7/2019 | Yoon et al. | | |
| 2020/0162719 A1* | 5/2020 | Tadi | .......................... | G06T 5/50 |

FOREIGN PATENT DOCUMENTS

| | | |
|---|---|---|
| CN | 104318569 A | 1/2015 |
| CN | 105654502 A | 6/2016 |
| CN | 107547879 A | 1/2018 |
| CN | 107917701 A | 4/2018 |
| CN | 108181319 A | 6/2018 |
| CN | 108227348 A | 6/2018 |
| CN | 108696730 A | 10/2018 |
| CN | 110300292 A | 10/2019 |

OTHER PUBLICATIONS

First Office Action issued in corresponding Chinese Application No. 201911045424.9; dated Jul. 20, 2020; State Intellectual Property Office of the P.R. China, Beijing, China, 14 pgs.

* cited by examiner

PROJECTION IMAGE AUTOMATIC CORRECTION METHOD AND SYSTEM BASED ON BINOCULAR VISION

CROSS REFERENCE TO RELATED APPLICATIONS

This disclosure is a Continuation Application of International Application No. PCT/CN2019/129586, filed on Dec. 28, 2019, which claims the priority to Chinese Patent Application No. 201911045424.9, entitled "PROJECTION IMAGE AUTOMATIC CORRECTION METHOD AND SYSTEM BASED ON BINOCULAR VISION", submitted to the China National Intellectual Property Administration on Oct. 30, 2019, which is hereby incorporated by reference in its entirety.

TECHNICAL FIELD

This disclosure belongs to the technical field of projectors, and specifically relates to a projection image automatic correction method and system based on binocular vision.

BACKGROUND

The most common mode of projector is vertical projection, that is, the beam emitted by the projector is vertically projected onto a plane to form an image. In vertical projection, the position of the projector should be at a right angle to the projection screen as much as possible to ensure the projection effect. If the two cannot be kept vertical, the projection image on the projection screen will be distorted. In this process, a trapezoidal correction technique is needed to correct the distorted projection image into a normal rectangular picture through a trapezoidal correction (or rectangular correction) algorithm, so as to get the desired projection effect.

The projector automatic trapezoidal correction in related art generally uses an acceleration sensor to measure the offset of the projector, and corrects the projection image by reverse compensation of the projection image. The acceleration sensor can measure the deflection angle in the vertical direction, however, when the projector only deflects in the horizontal direction, the deflection angle with the normal vector of the projection plane cannot be measured, resulting in poor picture correction effect. Multiple acceleration sensors are needed if the deflection angle in the horizontal direction needs to be measured, which increases the structural design difficulty and space of the projector, and also increases the input cost. Therefore, there is a need for a method to effectively adjust the projection device to solve the distortion of the projection image of the projection device.

SUMMARY

This disclosure provides a projection image automatic correction method and system based on binocular vision. A three-dimensional reconstruction of the projection image is performed based on the principle of binocular disparity, and a reverse transformation of the projection image is performed. As a result, the efficient automatic correction of the projection image is realized without being limited by the projection area, and the correction flexibility is high.

In order to solve the above technical problem, this disclosure provides a technical solution as follows.

A projection image automatic correction method based on binocular vision includes: acquiring a depth map of a projection image on a projection plane; calculating a first transformation relationship between a source image and the projection image; acquiring a distortion image according to the depth map; acquiring a correction image after correcting the distortion image; calculating a second transformation relationship between the distortion image and the correction image; acquiring a correction relationship between the source image and the correction image according to the first transformation relationship and the second transformation relationship; and correcting the projection image according to the correction relationship.

The projection image automatic correction method based on binocular vision as described above, the step of calculating a first transformation relationship between a source image and the projection image includes: calculating a transformation relationship A between the source image and a camera image according to a matching relationship between the source image and the camera image; calculating a transformation relationship B between the camera image and the projection image according to a depth value corresponding to the depth map and a matching relationship between the camera image and the projection image; and calculating the first transformation relationship according to the transformation relationship A and the transformation relationship B.

The projection image automatic correction method based on binocular vision as described above, the camera image is captured by a same camera.

The projection image automatic correction method based on binocular vision as described above, the step of calculating a first transformation relationship between a source image and the projection image includes: calculating the first transformation relationship according to a depth value corresponding to the depth map and a matching relationship between the source image and the projection image.

The projection image automatic correction method based on binocular vision as described above, the step of acquiring a depth map of a projection image on a projection plane includes: performing camera calibration on a left camera and a right camera; performing stereo correction on a left camera image captured by the left camera and a right camera image captured by the right camera; performing stereo matching on the left camera image and the right camera image; acquiring a disparity map of all corresponding points on the left camera image and the right camera image; and calculating the depth map according to the disparity map.

The projection image automatic correction method based on binocular vision as described above, the step of acquiring a correction image after correcting the distortion image includes: acquiring an inscribed rectangle of the distortion image.

The projection image automatic correction method based on binocular vision as described above, the step of acquiring an inscribed rectangle of the distortion image includes: identifying corner coordinates of four corners formed by four outer contour edges of the distortion image; calculating a midpoint coordinate of a midpoint of each outer contour edge; connecting midpoints of opposite outer contour edges to form an intersection point, where the intersection point is taken as a center point of the inscribed rectangle; calculating a nearest distance from the intersection point to each outer contour edge; and performing horizontal axis decomposition and vertical axis decomposition on the nearest distance in an image coordinate system, taking a length twice an amount of horizontal axis decomposition as one side length of the inscribed rectangle, and taking a length twice an amount of vertical axis decomposition as the other side length of the inscribed rectangle.

The projection image automatic correction method based on binocular vision as described above further includes: adjusting a size of the acquired inscribed rectangle.

This disclosure further relates to a projection image automatic correction system based on binocular vision, which includes a projector, two cameras and a main control unit, where the system further includes the following parts in communication connection with the main control unit: a projection image reconstructor configured for acquiring a depth map of a projection image and acquiring a distortion image according to the depth map; a first calculator configured for calculating a first transformation relationship between a source image and the projection image; an image acquisitor configured for acquiring a correction image after correcting the distortion image; a second calculator configured for calculating a second transformation relationship between the distortion image and the correction image; a third calculator configured for calculating a correction relationship between the source image and the correction image according to the first transformation relationship and the second transformation relationship; and a corrector configured for correcting the projection image projected onto a projection plane according to the correction relationship.

The projection image automatic correction system based on binocular vision as described above, where the two cameras are symmetrically arranged on both sides of a light-emitting surface of the projector, and a field of view of the two cameras is larger than a projection range of the projector.

According to the technical solution of this disclosure, the depth map and the transformation relationship between the source image and the projection image are acquired through visual reconstruction of the projection image, the distortion image of the projection image is acquired according to the depth map, and the distortion image is corrected to obtain the correction image. According to the transformation relationship between the source image and the projection image and the relationship between the distortion image and the correction image, it is convenient to correct the distortion of the projection image. The correction method collects, reconstructs and restores the projection image based on the binocular camera, which is not limited by the projection area and has high correction flexibility, the correction method is simple and fast, and the correction efficiency is high.

BRIEF DESCRIPTION OF THE DRAWINGS

In order to more clearly explain the embodiments of this disclosure or the technical solutions in the related art, the drawings used in the description of the embodiments or the related art will be briefly introduced below. Obviously, the drawings in the following description are merely some embodiments of this disclosure. For those of ordinary skill in the art, other drawings can be obtained based on these drawings without paying creative work.

DETAILED DESCRIPTION OF THE EMBODIMENTS

In order to make the objects, technical solutions and advantages of the embodiments of this disclosure clearer, the technical solutions in the embodiments of this disclosure will be clearly and completely described in connection with the drawings in the embodiments of this disclosure. Obviously, the described embodiments are only a part of the embodiments of this disclosure, and not all of the embodiments. Based on the embodiments of the present disclosure, all other embodiments obtained by those of ordinary skill in the art without creative efforts shall fall within the claimed scope of the present disclosure.

Figure 1:
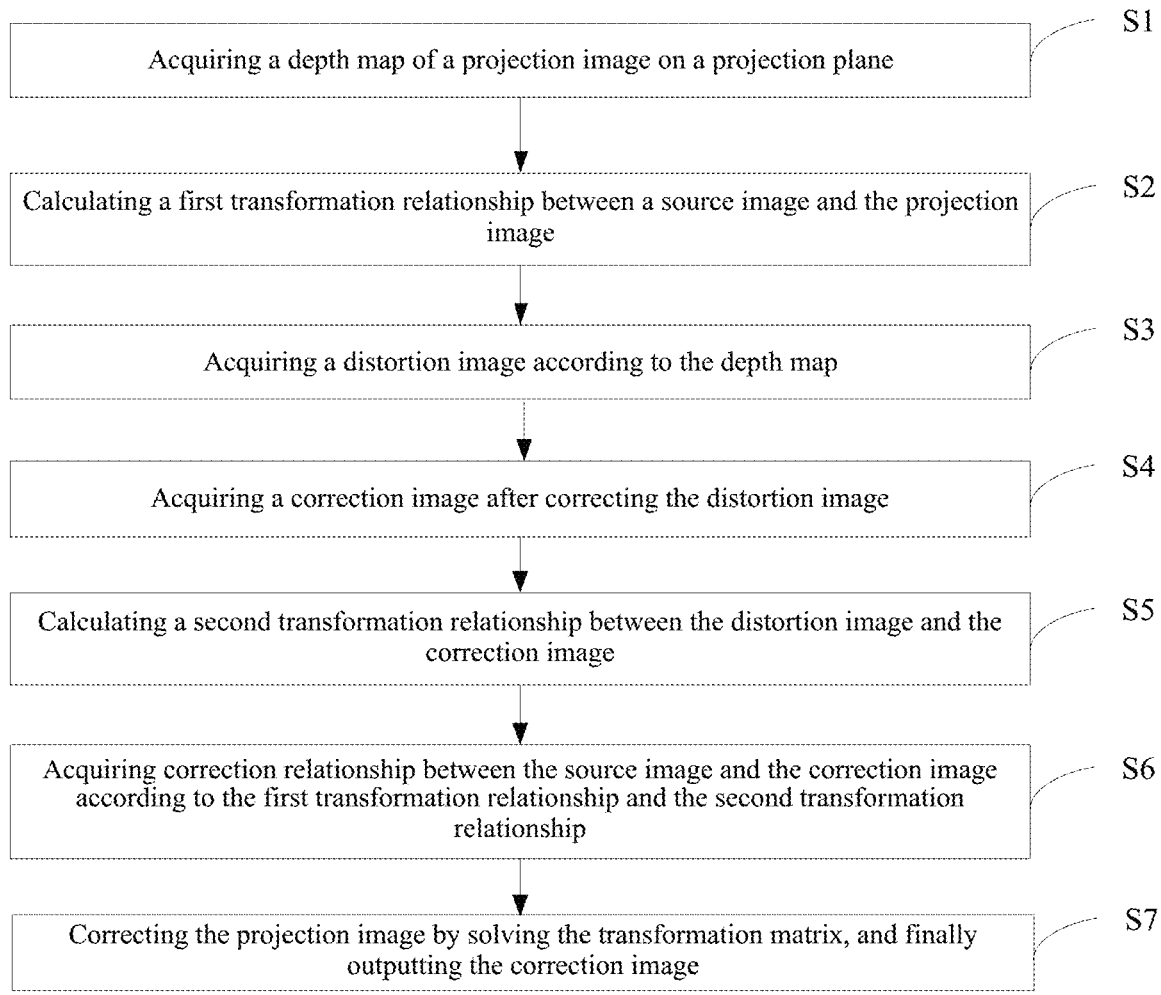
FIG. 1 is a flow chart of a projection image automatic correction method based on binocular vision according to an embodiment of this disclosure.

FIG. 1 shows the flow relationship of each stage, but does not represent the implementation order of the automatic correction method provided by this disclosure, the order of implementation of these stages is not necessarily the order shown in FIG. 1, and the order of implementation shown in FIG. 1 is only to clearly illustrate the automatic correction process of the projection image.

S1. Acquiring a depth map of a projection image P on a projection plane.

In this embodiment, two cameras 12 are symmetrically arranged on both sides of the projector 11, specifically on both sides of a light-emitting surface 111 of the projector 11, and the cameras 12 can detect depth. The field of view of the two cameras 12 can coincide with each other on the projection plane, and the field of view of the cameras 12 are larger than the projection range of the projector 11, this enables both cameras 12 to capture the projection image P projected onto the projection plane.

Figure 2:
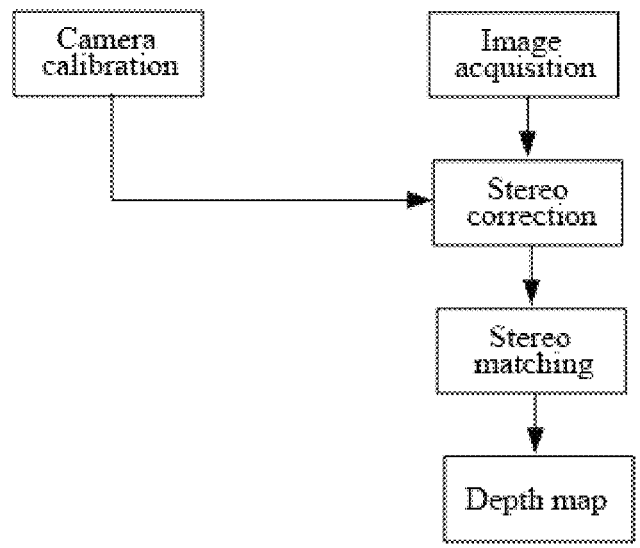
FIG. 2 is a flow chart of acquiring a depth image of the projection image automatic correction method based on binocular vision according to an embodiment of this disclosure.

Referring to FIG. 2, FIG. 2 shows the flow chart of acquiring the depth map of the projection image P, including: (1) camera calibration; (2) stereo correction; (3) stereo matching; and (4) depth map acquisition.

Specifically, in (1) camera calibration, the off-line calibration method is used to calibrate the cameras to find an internal parameter coefficient matrix Kc, an external parameter rotation matrix R, a translation vector t, and a distortion coefficient. The camera calibration method is generally implemented by OpenCV calibration function or MATLAB calibration toolbox. This camera calibration method is a mature and disclosed content in the field of digital image processing and will not be repeated here. OpenCV is a cross-platform open source computer vision library, which also provides interfaces in Python, Ruby, MATLAB and other languages, and realizes many general algorithms in image processing and computer vision.

(2) The specific implementation process of stereo correction is: a. turning on the two cameras and the projector, projecting, by the projector, a white noise image to the projection plane, and acquiring a left camera image and a right camera image taken by the two cameras at the same time; b. reading a camera calibration parameter file after the above mentioned camera calibration, and acquiring the internal parameter matrix, the external parameter rotation matrix, the translation vector and the distortion coefficient of the left camera and the right camera respectively; c. calculating the rotation matrix of the left camera image and the right camera image by using stereoRctify function in OpenCV; d. based on the inner parameter matrix and the outer parameter rotation matrix, using initUndistorRectifyMap function in OpenCV on the left camera image and the right camera image respectively to calculate mapping matrices of X and Y directions; e. obtaining corrected left camera image and right camera image by using remap function in OpenCV respectively on the left camera image and the right camera image according to the obtained mapping matrices; and f. cropping out effective areas of the corrected left camera image and right camera image to obtain a final result to complete the stereo correction process.

The internal circuit components of the cameras generate noise during the image acquisition process due to their own defects, unstable working environment, and complex response and interference inside the electronic circuit, therefore, the collected images can be pre-processed, such as image graying, geometric transformation, Gaussian filtering, so as to reduce noise and enhance the image.

(3) The stereo matching process is performed after finding corresponding pixels in the left camera image and the right camera image after stereo correction, that is, some pixels in the left camera image and some pixels in the right camera image corresponding to those pixels found at the time of correction. Specifically, first, the image can be pre-processed such as graying or Gaussian filtering, then the matching cost and matching cost aggregation of the left camera image and the right camera image are calculated (for details, please refer to the invention patent with application number "201711321133.9", and entitled "A Dust Detection Device and Method Based on Stereoscopic Vision"), and then disparity calculation and disparity optimization are performed. The above-mentioned stereo matching process is a mature and disclosed content in the field of digital image processing and will not be repeated here.

(4) Calculating a depth value z:

$$z = \frac{f \cdot b}{D}$$

of each pixel in the image according to two corresponding matching points m1 and m2 obtained from the structure of the left camera image and the right camera image after stereo matching, and a focal length f calibrated by the left camera and the right camera, where b is distance between optical centers of the two cameras, and D is disparity value between points m1 and m2. The depth map can be obtained according to the depth value z of each pixel.

S2. Calculating a first transformation relationship Q between a source image O and the projection image P.

A point p where any point o (u, v) in the source image is projected to the three-dimensional spatial coordinate position on the projection plane is (s, t, z), and then the point p is captured by one of the left camera and the right camera (for convenience of explanation, the left camera is selected in S2), and the coordinate fed back to the camera image C is c (x, y). Where, (s, t) in the point p (s, t, z) on the projection plane is transformed in the camera coordinate system, and the depth z is obtained by the above depth map. Point o (u, v) on the source image and point c (x, y) on the camera image are both in the image coordinate system.

In the first embodiment, the first transformation relationship Q between the source image O and the projection image P is calculated through the relationship among the source image O, the projection image P and the camera image C.

Figure 4:
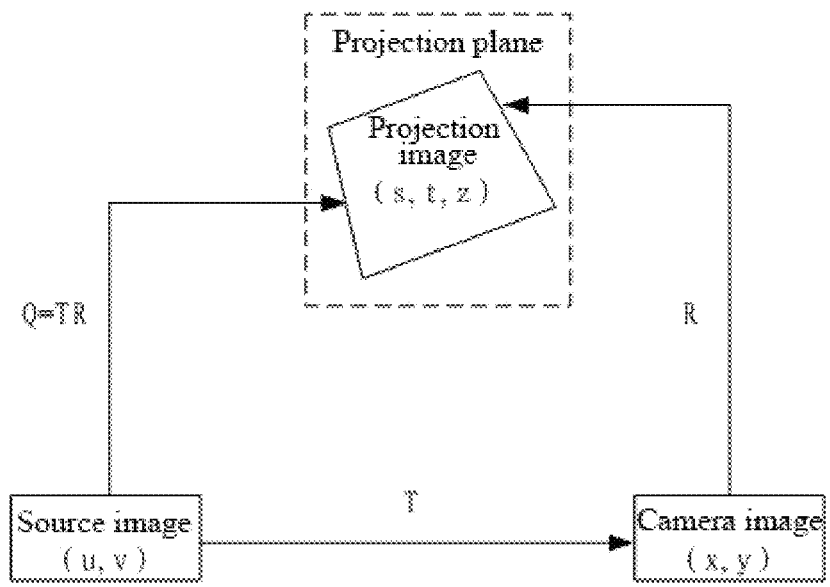
FIG. 4 is a schematic diagram of a relationship among a source image, a projection image and a camera image of the projection image automatic correction method based on binocular vision according to an embodiment of this disclosure.

As shown in FIG. 4, it is assumed that the spatial conversion relationship from the source image O to the camera image C is matrix T, and the spatial conversion relationship from the camera image C to the projection image P is matrix R, then the first transformation relationship between the source image O and the projection image P is matrix Q=TR. By solving the matrix Q dynamically to get rid of the restriction of projection area, correction of projection in any area can also be realized.

Specifically, the matrix T can be obtained by the following description process. The projector 11 can project a known image (such as a standard checkerboard image) and use Harris corner detection function in OpenCV to obtain the coordinates of the corner points in the source image O and the camera image C. Combined with feature point matching methods, for example, a method of reading the location of the specified corner point or a method of feature point matching such as SIFT, SURF, FAST, ORB in OpenCV may be used to enter the coordinates of, for example, four points in the source image O into a source array src respectively, and store the coordinates of the four points in the camera image C that correspondingly match the four points in a target array dst, then solve the homography matrix T (for example, the matrix of T is 3×3) between the source image O and the camera image C by calling findHomography function in OpenCV.

The matrix R can be obtained by the following description process. Since the point p (s, t, z) on the projection image P is a three-dimensional representation in the camera coordinate system, and the point c (x, y) on the camera image C is an imaging point in the image pixel coordinate system, the transformation of the camera image C to the projection image P is essentially the transformation of the image pixel coordinate system to the camera coordinate system, that is, the camera's internal parameter matrix Kc, R=Kc, where Kc has been calculated in the camera calibration.

In an alternative embodiment, the first transformation relationship Q may also be obtained directly from the relationship between the source image O and the projection image P without obtaining the matrix T.

The points on the projection image P in the camera coordinate system can be obtained according to the reconstructed depth map.

The first transformation relationship Q between the source image O and the projection image P is acquired by the point $x_p$ (s, t, z) on the projection image P and the point $x_o$ (u, v) on the source image O.

According to the transformation matrix R from the camera image C to the projection image P, it is known that R (s, t, 1)$^T$=(x, y, 1)$^T$, where point c (x, y) is obtained in advance by the method of corner detection (such as Harris corner detection, Fast corner detection, and SIFT feature point extraction), therefore, (s, t) in the corresponding point p (s, t, z) can be obtained correspondingly, and the z coordinate of the point p is obtained by the depth map.

In addition, referring to FIG. 4, the point p can be obtained according to the corner detection and matching of the source image O and the camera image C; $x_p$ (s, t, z) corresponds to the point $x_o$ (u, v) in the source image O, therefore, according to the feature point matching, the following formula can be established: $s\tilde{x}_o = Q\tilde{x}_p$, where, $\tilde{x}_p$ and $\tilde{x}_o$ are homogeneous coordinate forms of $x_p$ and $x_o$ respectively, and s is scale coefficient. Therefore, the transformation matrix Q between the source image O and the projection image P is a 3×4 matrix, since it is a homogeneous transformation, Q has 11 unknown coefficients and requires at least 6 corresponding points to solve Q.

Compared to the calculation method of Q in the first embodiment, this calculation method of Q simplifies the algorithm without calculating matrix T, and avoids introducing errors caused by calculating the matrix T between the source image O and the camera image C.

What needs to be explained is that the above camera images C are taken by the same camera, which can be taken by the left camera or by the right camera.

S3. Acquiring a distortion image according to the depth map.

The corresponding three-dimensional point coordinates under the depth image are the points under the camera coordinate system, while the distortion image are points under the image coordinate system, therefore, referring to FIG. 4, the depth map is converted into an image coordinate system by using the internal parameter matrix Kc in camera calibration, that is, $(x, y, 1)^T = Kc (s, t, 1)^T$.

S4. Acquiring a correction image after correcting the distortion image.

Figure 3:
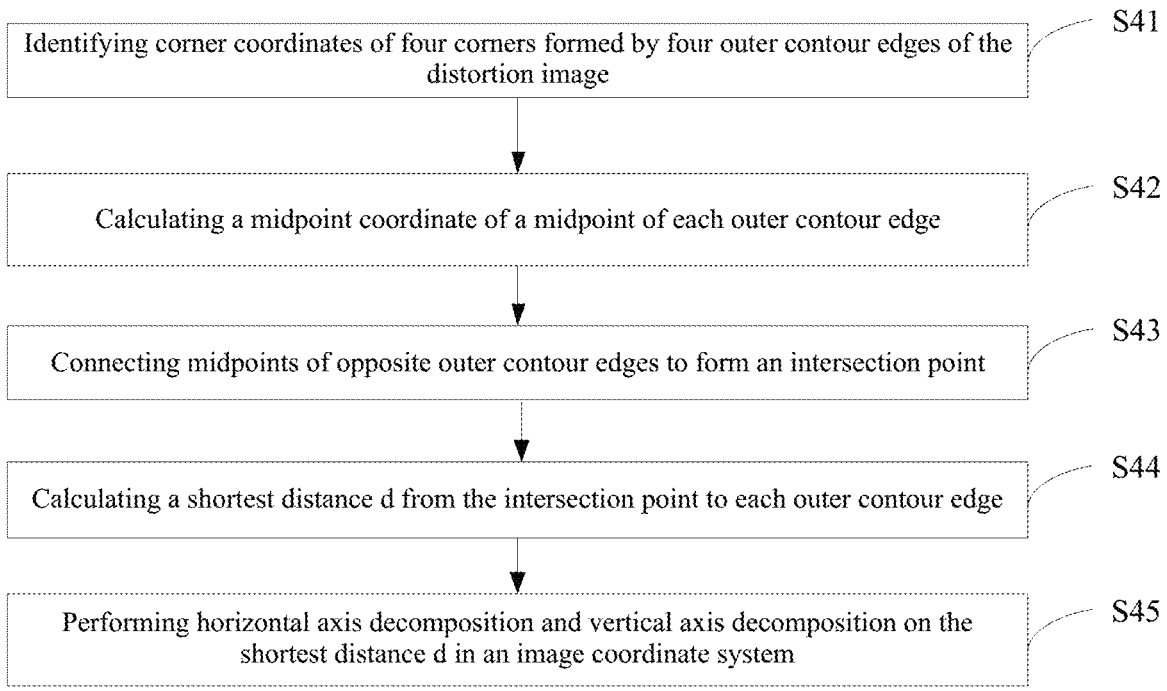
FIG. 3 is a flow chart of acquiring a correction image of the projection image automatic correction method based on binocular vision according to an embodiment of this disclosure.

In this embodiment, the inscribed rectangle of the distortion image may be selected as the correction image. Specifically, see FIG. 3.

S41. Identifying corner coordinates of four corners formed by four outer contour edges of the distortion image.

The edge detection of the image is also a mature and disclosed content in the field of digital image processing. For example, contour detection function findContours in OpenCV can identify the coordinates of the outer contour points of the distortion image, and the corner coordinates of the four corners formed by the outer contour edge denoted as x1, x2, x3 and x4 are preferred, where the points where x1, x2, x3 and x4 are located are in a clockwise direction.

S42. Calculating a midpoint coordinate of a midpoint of each outer contour edge.

Calculating O1 as the midpoint of x1 and x2, O2 as the midpoint of x2 and x3, O3 as the midpoint of x3 and x4, and O4 as the midpoint of x4 and x1.

S43. Connecting midpoints of opposite outer contour edges to form an intersection point, where the intersection point is taken as a center point of the inscribed rectangle.

Connecting O1 and O3, and O2 and O4 to form an intersection point O, and the point O is taken as the center point of the inscribed rectangle.

S44. Calculating a nearest distance d from the intersection point to each outer contour edge.

Specifically, the coordinates of point O are passed into PointPolygonTest function of OpenCV, and the nearest distance d from the O point to the edge of each outer contour is returned.

S45. Performing horizontal axis decomposition and vertical axis decomposition on the nearest distance d in an image coordinate system.

The nearest distance d is decomposed in x direction (namely the horizontal axis direction) and y direction (namely the vertical axis direction) respectively under the image coordinate system xy where the camera image C is located, a length twice an amount of horizontal axis decomposition is taken as one side length of the inscribed rectangle, and a length twice an amount of vertical axis decomposition is taken as the other side length of the inscribed rectangle.

In this way, the inscribed rectangle is the image after distortion image correction.

In addition, in order to make the inscribed rectangle meet the output picture size of the standard (16:9 or 4:3), the size of the inscribed rectangle is adjusted by using the image scaling function resize in OpenCV.

S5. Calculating a second transformation relationship S between the distortion image and the correction image.

Because the distortion image and the correction image are both in the image coordinate system, and the feature points of the distortion image can be selected from the corner points of the four corners formed by the outer contour edge, and the feature points of the correction image are correspondingly selected from the four vertices of the inscribed rectangle, the transformation relationship matrix S from the distortion image to the correction image can be obtained according to the transformation relationship and the corresponding four groups of point coordinates.

Figure 5:
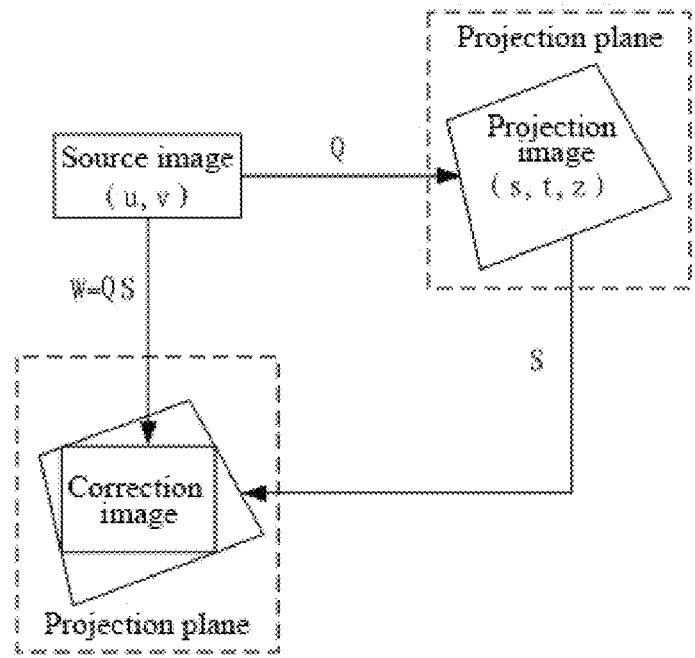
FIG. 5 is a schematic diagram of a relationship between the source image and the projection image of the projection image automatic correction method based on binocular vision according to an embodiment of this disclosure.

S6. Referring to FIG. 5, acquiring correction relationship W=QS between the source image O and the correction image according to the first transformation relationship matrix Q from the source image O to the projection image P and the second transformation relationship matrix S from the distortion image on the projection plane to the correction image.

S7. correcting the projection image P by solving the transformation matrix W, and finally outputting the correction image.

According to the projection image automatic correction method in this disclosure, the calculation amount is small, and the correction efficiency is improved. The projection image is collected, reconstructed and restored based on the binocular camera. The first transformation relationship matrix Q and the second transformation relationship matrix S are dynamically calculated without being restricted by the projection area, and the function of automatic correction can be realized on any projection plane, which improves the flexibility of the projector.

Figure 6:
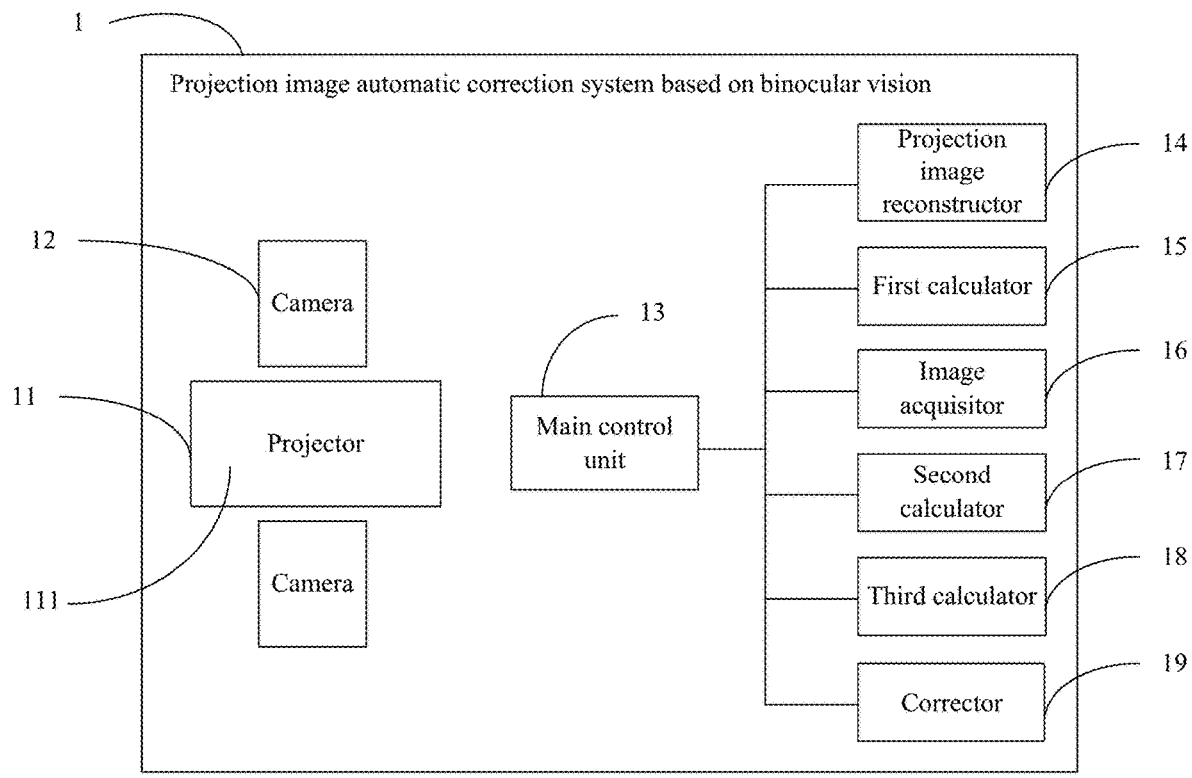
FIG. 6 is a schematic structural diagram of a projection image automatic correction system based on binocular vision according to an embodiment of this disclosure.

This disclosure further provides a projection image automatic correction system based on binocular vision 1, which is configured for realizing the above-mentioned projection image automatic correction method. Referring to FIG. 6, FIG. 6 is a schematic structural diagram of a projection image automatic correction system based on binocular vision according to an embodiment of this disclosure. Specifically, the system includes a projector 11, two cameras 12 and a main control unit 13, the two cameras 12 are symmetrically located on both sides of a light-emitting surface 111 of the projector 11, the field of view coincides with each other, and the field of view range is greater than the projection range of the projector 11. The main control unit 13 is configured to control the operation of the whole control system of the projector 11 and the two cameras 12, and functions such as image recognition and processing, processing of projection video signals, and power management of the projector 11 and the two cameras 12. The main control unit 13 can be a core processor such as Microcontroller Unit (MCU) and Application Processor (AP).

The automatic correction system 1 of this embodiment further includes a projection image reconstructor 14, which is configured for acquiring a depth map of a projection image P and acquiring a distortion image according to the depth map; a first calculator 15 configured for calculating a first transformation relationship Q between a source image O and the projection image P; an image acquisitor 16 configured for acquiring a correction image after correcting the distortion image; a second calculator 17 configured for calculating a second transformation relationship S between the distortion image and the correction image; a third calculator 18 configured for calculating a correction relationship W between the source image O and the correction image according to the first transformation relationship Q and the second transformation relationship S; and a corrector 19 configured for correcting the projection image P according to the correction relationship W.

Finally, it should be noted that the above embodiments are only used to illustrate the technical solutions of this disclosure, and not to limit them; although this disclosure is described in detail with reference to the foregoing embodiments, those of ordinary skill in the art should understand that the technical solutions recorded in the foregoing embodiments can still be modified, or some of the technical features can be replaced; however, these modifications or replacements do not depart the essence of the corresponding technical solutions from the spirit and scope of the technical solutions of the embodiments of this disclosure.

What is claimed is:

1. A projection image automatic correction method based on binocular vision, comprising:
    acquiring a depth map of a projection image on a projection plane;
    calculating a first transformation relationship between a source image and the projection image;
    acquiring a distortion image according to the depth map;
    acquiring a correction image after correcting the distortion image;
    calculating a second transformation relationship between the distortion image and the correction image;
    acquiring a correction relationship between the source image and the correction image according to the first transformation relationship and the second transformation relationship; and
    correcting the projection image according to the correction relationship.

2. The projection image automatic correction method based on binocular vision of claim 1, wherein the step of calculating a first transformation relationship between a source image and the projection image comprises:
    calculating a transformation relationship A between the source image and a camera image according to a matching relationship between the source image and the camera image;
    calculating a transformation relationship B between the camera image and the projection image according to a depth value corresponding to the depth map and a matching relationship between the camera image and the projection image; and
    calculating the first transformation relationship according to the transformation relationship A and the transformation relationship B.

3. The projection image automatic correction method based on binocular vision of claim 2, wherein the camera image is captured by a same camera.

4. The projection image automatic correction method based on binocular vision of claim 1, wherein the step of calculating a first transformation relationship between a source image and the projection image comprises:
    calculating the first transformation relationship according to a depth value corresponding to the depth map and a matching relationship between the source image and the projection image.

5. The projection image automatic correction method based on binocular vision of claim 1, wherein the step of acquiring a depth map of a projection image on a projection plane comprises:
    performing camera calibration on a left camera and a right camera;
    performing stereo correction on a left camera image captured by the left camera and a right camera image captured by the right camera;
    performing stereo matching on the left camera image and the right camera image;
    acquiring a disparity map of all corresponding points on the left camera image and the right camera image; and
    calculating the depth map according to the disparity map.

6. The projection image automatic correction method based on binocular vision of claim 1, wherein the step of acquiring a correction image after correcting the distortion image comprises:
    acquiring an inscribed rectangle of the distortion image.

7. The projection image automatic correction method based on binocular vision of claim 6, wherein the step of acquiring an inscribed rectangle of the distortion image comprises:
    identifying corner coordinates of four corners formed by four outer contour edges of the distortion image;
    calculating a midpoint coordinate of a midpoint of each outer contour edge;
    connecting midpoints of opposite outer contour edges to form an intersection point, wherein the intersection point is taken as a center point of the inscribed rectangle;
    calculating a nearest distance from the intersection point to each outer contour edge; and
    performing horizontal axis decomposition and vertical axis decomposition on the nearest distance in an image coordinate system, taking a length twice an amount of horizontal axis decomposition as one side length of the inscribed rectangle, and taking a length twice an amount of vertical axis decomposition as the other side length of the inscribed rectangle.

8. The projection image automatic correction method based on binocular vision of claim 7, further comprises:
    adjusting a size of the acquired inscribed rectangle.

9. A projection image automatic correction system based on binocular vision, comprising a projector, two cameras and a main control unit, wherein the system further comprises the following parts in communication connection with the main control unit:
    a projection image reconstructor configured for acquiring a depth map of a projection image and acquiring a distortion image according to the depth map;
    a first calculator configured for calculating a first transformation relationship between a source image and the projection image;
    an image acquisitor configured for acquiring a correction image after correcting the distortion image;
    a second calculator configured for calculating a second transformation relationship between the distortion image and the correction image;
    a third calculator configured for calculating a correction relationship between the source image and the correction image according to the first transformation relationship and the second transformation relationship; and a corrector configured for correcting the projection image projected onto a projection plane according to the correction relationship.

10. The projection image automatic correction system based on binocular vision of claim 9, wherein the two cameras are symmetrically arranged on both sides of a light-emitting surface of the projector, and a field of view of each of the two cameras is larger than a projection range of the projector.

* * * * *